US009866435B2

(12) United States Patent
Amato (10) Patent No.: US 9,866,435 B2
(45) Date of Patent: Jan. 9, 2018

(54) LAWFUL INTERCEPT MANAGEMENT MODULES AND METHODS FOR LI-CONFIGURATION OF AN INTERNAL INTERCEPTION FUNCTION IN A CLOUD BASED NETWORK

(71) Applicant: TELEFONAKTIEBOLAGET L M ERICSSON (PUBL), Stockholm (SE)

(72) Inventor: Guiseppe Amato, Salerno (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 330 days.

(21) Appl. No.: 14/402,258

(22) PCT Filed: Oct. 16, 2014

(86) PCT No.: PCT/SE2014/051224
§ 371 (c)(1),
(2) Date: Sep. 29, 2015

(87) PCT Pub. No.: WO2016/060597
PCT Pub. Date: Apr. 21, 2016

(65) Prior Publication Data
US 2016/0112261 A1    Apr. 21, 2016

(51) Int. Cl.
*G06F 15/177* (2006.01)
*H04L 12/24* (2006.01)
*H04L 29/06* (2006.01)
*H04L 29/08* (2006.01)

(52) U.S. Cl.
CPC ...... *H04L 41/0816* (2013.01); *H04L 41/0869* (2013.01); *H04L 63/30* (2013.01); *H04L 63/306* (2013.01); *H04L 67/10* (2013.01)

(58) Field of Classification Search
CPC ..... H04L 29/06; H04L 12/24; H04L 41/0816; H04L 63/306; H04L 63/30; H04L 41/0869; H04L 67/10
See application file for complete search history.

(56) References Cited

PUBLICATIONS

ETSI NFV-SEC; Reply to the Liaison Statement on Lawful Intercept; May 15, 2014.
Draft ETSI DTR 101 567 V0.5.0; Draft Technical Report; Lawful Interception (LI); Cloud/Virtual Services (CLI); Jun. 2014.
ETSI TS 101 671 V2.15.1; Lawful Interception (LI); Handover interface for the lawful interception of telecommunications traffic; Nov. 2006.

(Continued)

*Primary Examiner* — Benjamin M Thieu (57) ABSTRACT

A method and a Lawful Intercept, LI, management module for LI configuration of an Internal Interception Function, IIF, which is hosted by a Virtual Network Function, VNF, in a cloud based network and for keeping a LI administration mediation function, ADMF, in a LI system, updated regarding the current LI configuration in the cloud based network. The method comprises receiving a notification comprising a VNF and its VNF characteristics, making LI configuration decisions based on VNF characteristics and a LI policy from a LI policy database, performing a LI configuration of the VNF and the IIF in accordance with configuration decisions, storing the VNF/IIF characteristics in the LI policy database, if configuration was successful, and updating the LI ADMF about new LI configuration of the cloud based network.

12 Claims, 10 Drawing Sheets

(56) References Cited

PUBLICATIONS

ETSI TS 102 232-2 V2.2.1; Lawful Interception (LI); Handover Interface and Service-Specific Details (SSD) for IP delivery; Part 2: Service-specific details for E-mail services; May 2007.
ETSI TS 101 232-3 V2.3.1; Lawful Interception (LI); Handover Interface and Service-Specific Details (SSD) for IP delivery; Part 3: Service-specific details for internet access services, Aug. 2011.
ETSI TS 101 232-4 V2.2.1; Lawful Interception (LI); Handover Interface and Service-Specific Details (SSD) for IP delivery; Part 4: Service-specific details for Layer 2 services; Apr. 2010.
ETSI TS 101 232-5 V2.3.1; Lawful Interception (LI); Handover Interface and Service-Specific Details (SSD) for IP delivery; Part 5: Service-specific details for IP Multimedia services; Apr. 2008.
ETSI GS NFV-INF 001 V1.1.1; Network Functions Virtualisation (NFV); Infrastructure Overview; Jan. 2015.
ETSI GS NFV-MAN 001 V1.1.1; Network Functions Virtualisation (NFV); Management and Orchestration; Dec. 2014.
ETSI GS NFV 001 V1.1.1; Network Functions Virtualisation (NFV); Use Cases; Oct. 2013.
ETSI; Group Specification; Network Function Virtualisation (NFV); Resiliency Requirements; NFV RELA_GS_13_0610_v003; Feb. 2013.
Draft ETSI DTR 101 567 V0.4.0; Draft Technical Report; Lawful Interception (LI); Cloud/Virtual Services (CLI); May 2014.

LAWFUL INTERCEPT MANAGEMENT MODULES AND METHODS FOR LI-CONFIGURATION OF AN INTERNAL INTERCEPTION FUNCTION IN A CLOUD BASED NETWORK

RELATED APPLICATIONS

This application is a 371 of international application PCT/SE2014/051224, filed Oct. 16, 2014, the disclosure of which is fully incorporated herein by reference.

TECHNICAL FIELD

The present technology relates to a method and a node in a wireless communication network.

BACKGROUND

The NFV initiative aims to create a unique network architectural framework for network function virtualization and, at same time, to keep same level of feature and telco grade as before and to align all the different telco, open source and IT initiatives to a clear defined set of logical function, interfaces and interworking procedures.

For the purpose of our invention we consider it as the reference cloud based network since the NFV architecture is supported by the majority of telco, IT big players and can be easily mapped to most of real cloud infrastructure and virtualized functions available today.

Figure 1:
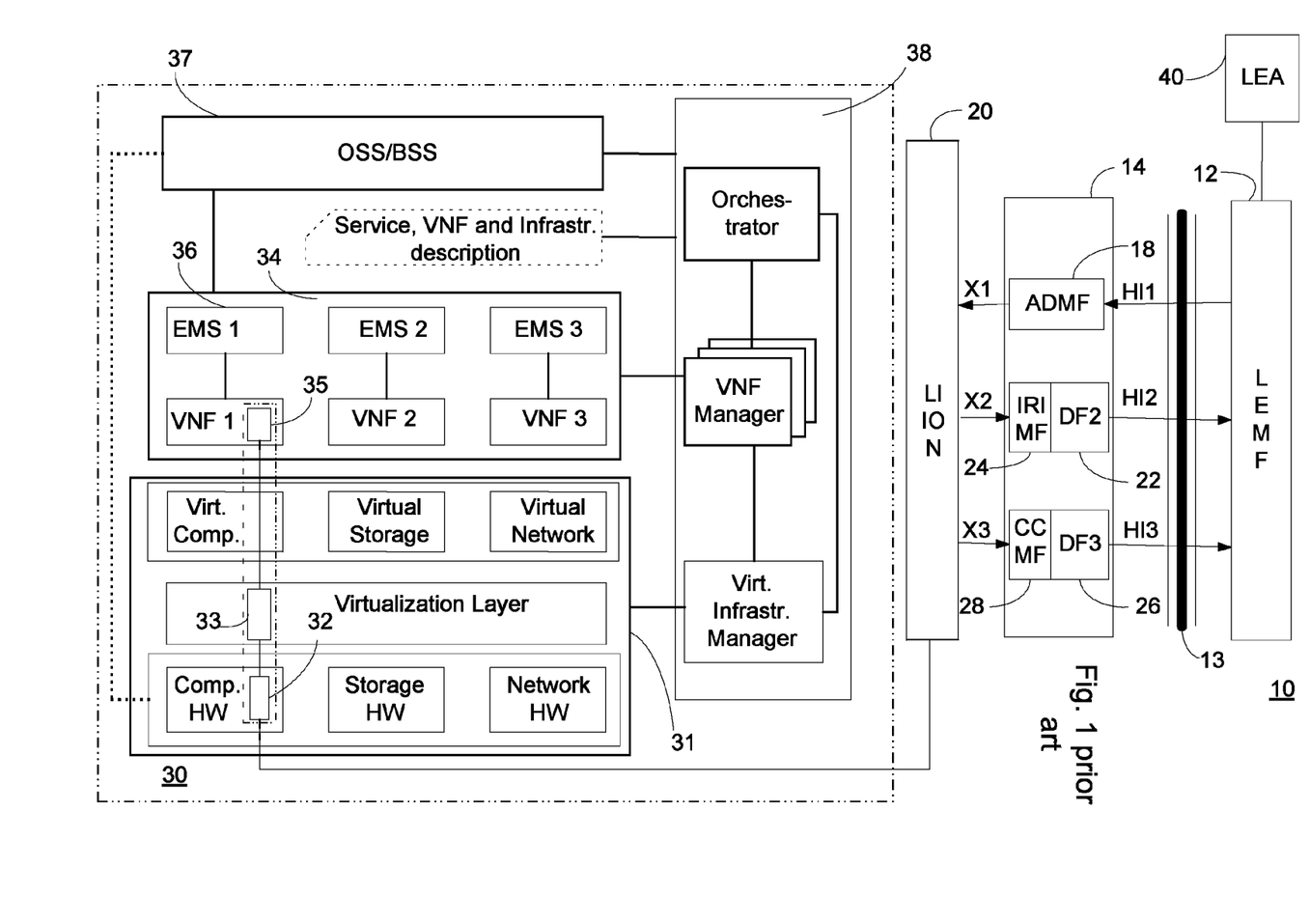
FIG. 1 is a block diagram illustrating a Lawful Interception system connected to a cloud based network according to prior art.

FIG. 1 is illustrating a Lawful Interception system connected to a cloud based network according to prior art.

The illustrated LI system 10 comprises a Law Enforcement Monitoring Facility (LEMF) 12, a LI external network 13, a physical LI site 14, a LI internal operator network 15 and means 16 for intercepting subscriber sessions and retrieving Communication Content and Intercepted Related Information of the intercepted sessions.

The IIF means 16 comprises an Internal Interception Function (IIF). Said IIF means 16 is located in nodes 20 of a telecommunications network.

The physical LI site 14 is also denoted Intercept Mediation and Delivery Unit (IMDU) and it comprises an Administration Function (ADMF) 18, an IRI Mediation Function (IRI MF) 24, a Delivery Function (DF2) 22, a CC Mediation Function (CC MF) 28 and a Delivery Function (DF3) 26. The LI external network 13 handles the standardized interfaces HI1, HI2 and HI3 between the physical LI site 14 and the LEMF 12. The LI internal operator network 15 handles the interfaces X1, X2 and X3 between the physical LI site 14 and the nodes 20 comprising IIF means 16.

An IIF realizes the interception of the communications to/from a provisioned subscriber, even denoted as a target. The administration function, ADMF, 18 provides the identity of the monitored subscriber according to a warrant emitted by local authorities via an X1 interface. For each intercepted session by a target, the IIF produces a sequence of Intercepted Related Information, IRI, containing the information about call participants, call progress and other relevant parameters. If required by a warrant, the IIF produces also a copy of the call content transmitted and received by the monitored subscriber. Call content is denoted Communication Content, CC, according to the LI standardization. The IIFs delivers IRI to a IRI mediation function via an X2 interface and Communications Content via an X3 interface.

The IRI Mediation Function (IRI MF) 24 validates, complements with other information, formats the received IRI in a standard format, called HI2, and delivers by means of the DF2 22 the IRI to the LEMF 12 via the HI2 handover interface.

The CC Mediation Function (CC MF) 28 is a corresponding functionality as the IRI MF, i.e. it validates, complements with other information, formats the received CC in a standard format, called HI3, and delivers by means of DF3 26 the CC to the LEMF 12 via an HI3 handover interface.

The LEMF 12 is the agency facility located outside the network operator where the intercepted IRI and CC is collected and finally used by local authorities for any legal and investigation purposes.

The NFV architecture captures and describe how a network function (NF) is created and managed in cloud environments to deal with the three following main differences respect to the native (non virtualized) deployment:

Decoupling software from hardware: a vendor will not provide any longer an integrated HW and SW network function. They could be provided by different vendors and evolve independently.

Flexible network function deployment: the decoupling of SW and HW open the possibility to share HW between different service hence to enable a faster and flexible creation of services as composition of SW application instances sharing the same physical platform. The flexibility represent a benefit but introduce also the need of a more advanced management able to compose service and manage them along their lifecycle.

Dynamic operation: the HW resources can be allocated on needed base with an optimal distribution among all the applications as well as the possibility to change the allocation to dynamically increase the performance of the application when at run time.

The FIG. 1 contains the current reference architecture of NFV framework of a cloud based network as described in ETSI NFV specification.

The cloud based network 30 is composed by three main sub-domains:

The Virtualized Network Functions 34—VNF—as the software implementation of a network function which is capable of running over the NFVI.

The domain contains both the network functions and its associated element management system—EMS 36—(i.e. the software responsible to local configure and maintain the network function parameters as local agent of the global OSS).

How these function get virtualized depends on the underlying NFVI e.g. the virtualization layer can provide a full virtual host fully simulating a real HW/SW host or virtualize only some OS functions while keep the rest native).

The NFV infrastructure 31—NFVI—including the diversity of physical resources and how these can be virtualised. NFVI supports the execution of the VNFs.

It comprises the actual HW computational, storage and network resources and the middleware virtualization SW creating logical partitions of them and providing an interface to enable VNFs to use them. Such interface is also called container.

The NFV Management And Orchestration 37 and 38—MANO—which covers the orchestration and life-cycle management of physical and/or software resources that support the infrastructure virtualisation, and the lifecycle management of VNFs. NFV Management and Orchestration focuses on all virtualisation-specific management tasks necessary in the NFV framework.

The management is achieved by the following management functions, one for each layer of the NFV. They are logically separated but this does not exclude they can be implemented in one SW module:

The virtualised infrastructure management comprises the functionalities that are used to control and manage the interactions of a VNF with computing, storage and network resources under its authority, as well as their virtualisation.

A VNF Manager is responsible for VNF lifecycle management (e.g. instantiation, update, query, scaling, termination). Multiple VNF Managers may be deployed; a VNF Manager may be deployed for each VNF, or a VNF Manager may serve multiple VNFs.

The Orchestrator is in charge of the orchestration and management of NFV infrastructure and software resources, and realizing network services on NFVI. It acts as the main front end to a user of the cloud who intends to create, activate, terminate new services.

The OSS/BSS (Operation Support System/Business Support System) is in charge of configuring and administering the VNF similarly at what it does for non-virtualized network function. The OSS/BSS is not charge and not allowed to configure LI functions.

A network service is defined as a set of VNFs, network connections between them and a deployment template, is provisioned by an orchestrator user and stored in the orchestrator DB called catalog.

The data-set "Service, VNF and Infrastructure Description" is a complementary context specific additional info. This data-set provides information regarding the VNF deployment template, VNF Forwarding Graph (i.e. network connection graph), service-related information, and NFV infrastructure information models.

The interception access point (IAP), also named internal interception function (IIF) can be embedded in a network function or be a separate network function itself (e.g. a passive LI probe system). As for other network function, the decoupling of HW/SW in NFV lead also to a split of IIF in multiple interception points distributed in all NFV layers, independent each other, potentially provided by different vendors and owned by different stakeholders.

In particular a IIF getting virtualized can be split in:

A virtual IIF function along the VNF is which is embedded (35) e.g. in a virtual CSCF or SBG or a VNF itself if the IIF is a separate application (35) e.g. a virtual passive LI probe.

In the latter case an associate virtual EMS could be not present or be replaced by virtual probe management agent.

An IIF as interception function provided by the virtualization middleware for each VNF to which it provides a container (33) e.g. a function able to sniff all the disk I/O or network traffic.

An IIF as an HW probe system (32) which analyses all the IP traffic in HW network and extract traffic relevant for a specific monitored user and protocol.

Figure 2:
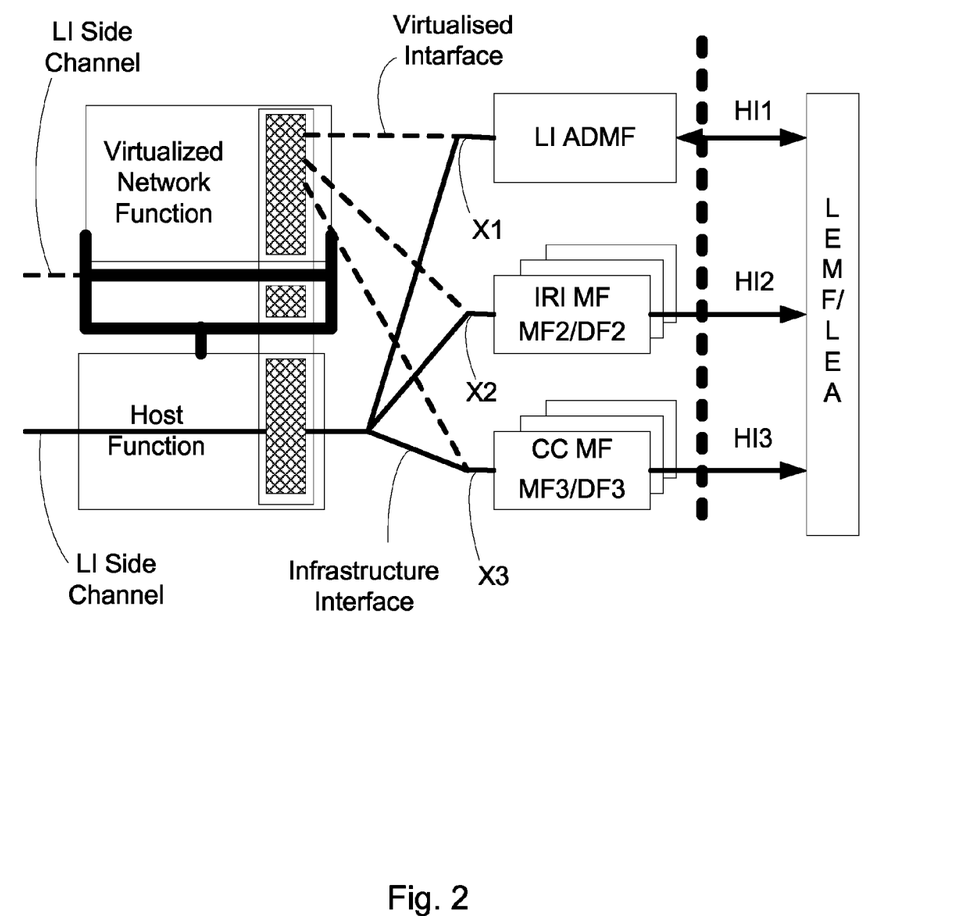
FIG. 2 is a block diagram illustrating a Virtual Network Function connected to a LI system.

The other figure, FIG. 2, illustrates and describes more in detail the split of a IIF embedded in a VNF. According to ETSI NFV GS MAN001 a network function when virtualized is decoupled in an host function i.e. a logical partition of HW resources, a container i.e. a virtual machine which can host a VNF, and a virtual application i.e. the VNF.

Similarly any interface as well as IIF interfaces of the original network function get split in two interfaces: one HW network interface on which real traffic will flow through and one virtual which will represent a virtual channel made available from HW network interface to the VNF by the virtualization layer.

In addition for a LI there are also other two interfaces: the container side channel exposed by the IIF described in 33 and HW side channel exposed by the IIF described in 32. The main effects of the migration is that the number of interception points, aka IIF, increases significantly, are distributed in a large network cloud system or even on more than one and can be used independently or in combination to realize a LI service. This situation from one view point increases the flexibility of the LI solution but from another side it increases the possibility to abuse of it. Furthermore a LI function has a cost in terms of resources and impact of normal traffic function, both should be minimized.

SUMMARY

The object of the following technique intends to fill the LI architectural gap in the cloud based system proposing a new management function for LI which takes care both of ensuring LI security and optimal management of virtualized IIF embedded in a VNF, instantiated as a standalone VNF or provided by the infrastructure as well as of the related LI network.

Method in a Lawful Intercept, LI, management module for LI configuration of an Internal Interception Function, IIF, hosted by Virtual Network Function, VNF, in a cloud based network and for keeping a LI administration mediation function, ADMF, in a LI system, updated regarding the current LI configuration in the cloud based network. Said method comprises receiving notification comprising VNF and its VNF characteristics, and making of LI configuration decisions based on VNF characteristics and LI policy from LI policy database. The method further comprises performing LI configuration of VNF and IIF in accordance with configuration decisions, and storing VNF/IIF characteristics in LI policy database, if configuration was successful, and updating the LI ADMF about new LI configuration of the cloud based network.

A Lawful Intercept, LI, management module for LI configuration of an Internal Interception Function, IIF, hosted by Virtual Network Function, VNF, in a cloud based network and for keeping a LI administration mediation function, ADMF, in a LI system, updated regarding the current LI configuration in the cloud based network, wherein the LI management module comprises a processing circuitry operative to perform receiving Notification comprising VNF and its VNF characteristics, making LI configuration decisions based on VNF characteristics and LI policy from LI policy database, and performing LI configuration of VNF and IIF in accordance with configuration decisions. The processing circuitry is further operative of storing VNF/IIF characteristics in LI policy database, if configuration was successful, and updating the LI ADMF about new LI configuration of the cloud based network.

One advantage of the enclosed technique is minimization of the complexity of LI management in NFV cloud based networks. Further one advantage is the enablement of automated deployment of network services in cloud providing a method for LI configuration of a NVF based service at creation time and during its lifecycle. Without it a network service requiring LI could not be deployed and would become a showstopper for whole cloud business model.

BRIEF DESCRIPTION OF THE DRAWINGS

The foregoing, and other, objects, features and advantages of the present technology will be more readily understood upon reading the following detailed description in conjunction with the drawings in which.

DETAILED DESCRIPTION

In the following description, for purposes of explanation and not limitation, specific details are set forth, such as particular circuits, circuit components, techniques, etc. in order to provide a thorough understanding of the present technique. However, it will be apparent to one skilled in the art that the present technique and technology may be practiced in other embodiments that depart from these specific details. In other instances, detailed descriptions of well-known methods, devices, and circuits are omitted so as not to obscure the description of the present technique with unnecessary detail.

The following technology and architecture for Lawful Intercept management in an ETSI Network Function Virtualization, NFV, compliant network. In the subsequent description, NFV based service is widely discussed and used. With a service based on NFV is meant a service provided to cloud end user, e.g. Intercept Mediation System, IMS, communication service, according to NFV principles by a set of VNF instances and related virtual network setup over a cloud infrastructure. According to the NFV principles in ETSI GS NFV INF 001 a network function, e.g. IIF, is decomposed from current monolithical/self-contained architecture and interfaces to several components and interfaces belonging to different layers and administrative domains.

A network function currently delivered as one application of HW, OS and application will then delivered as a SW only application instance called Virtual Network Function, VNF, on an infrastructure resources subset resembled to form a virtual HW host, host function, and a container interfaces interfacing the two, typically based on a virtualization layer interface. NFV specify also that VNF as sub-composed by so called Virtual Network Function Component (VNFC) to allow further flexibility in building a network virtual function.

Figure 9:
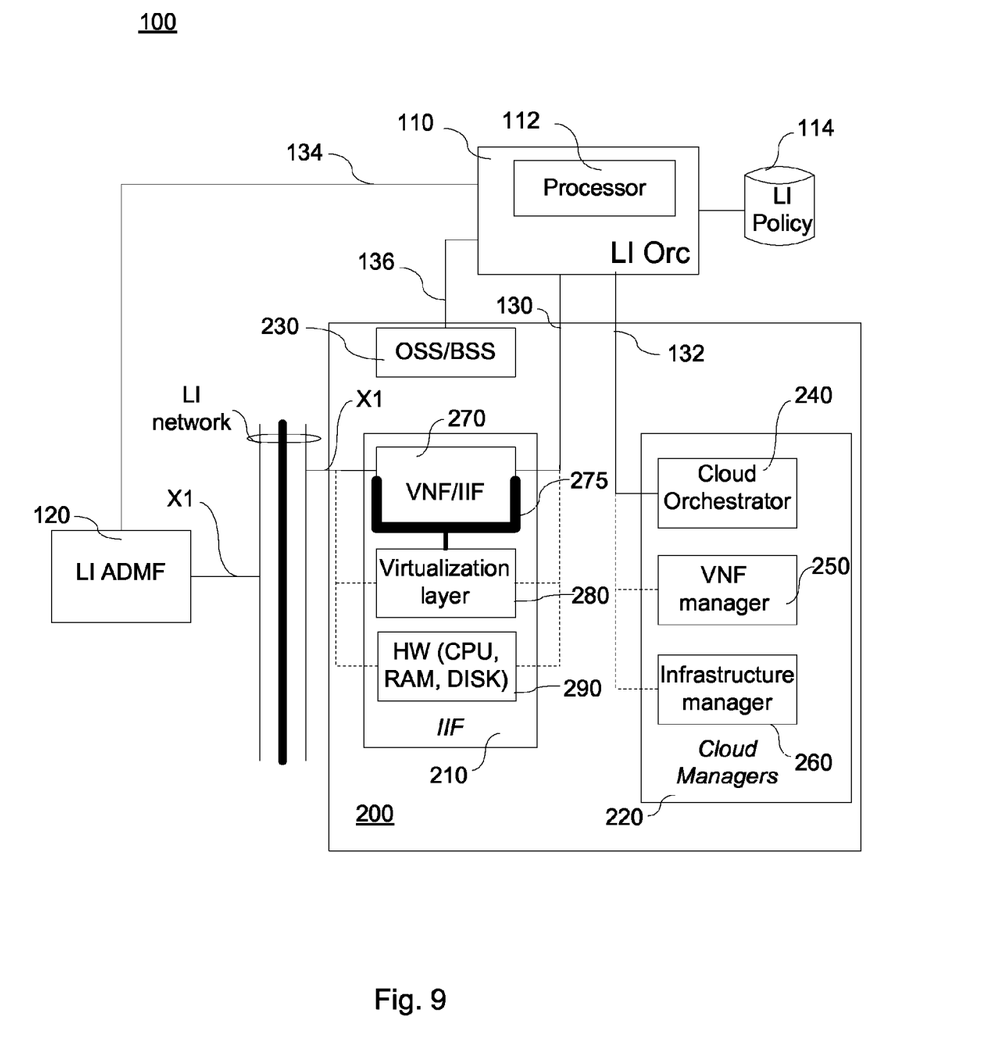
FIG. 9 is a block diagram illustrating an arrangement, hereafter denoted as Lawful Intercept management function module in a LI system.

FIG. 9 is a block diagram illustrating an arrangement, hereafter denoted as Lawful Intercept, LI, management function module in a LI system. FIG. 9 is a schematic block diagram, which is a simplified illustration of a LI system 100 and a supporting cloud based network 200. The cloud based network 200 is connected to the LI system for supporting a number of functionalities of the LI system.

A new component or module is a functional entity called LI management function module 110. In one embodiment, the LI management function module includes the Administration Mediation Function, ADMF. However, the embodiment of the LI management function module hereafter described and discussed is adapted to communicate over an interface with an Intercept Mediation System, IMS, comprising the ADMF. It may be involved and/or in charge of the following automatic actions for each new, created or modified NFV based service:

To define if LI is required and allowed;
To identify which are the IIF to be involved and/or require the creation of VNF instance implementing needed IIF for the service;
To activate and configure VNF with IIF, MF and secure LI network between them;
To re-configure VNF with IIF, MF and LI network during all the service lifecycle like in correspondence of scaling action, virtual machine migration, failover procedure, load balancing and virtual network changes;
To optionally assess, control and audit security of the VNF with IIF, MF and LI network.

The LI management function module 110 is not assumed to be located in a specific administrative domain among the ones already defined in the NFV standard ETSI NFV. The decision on which domain it should belong to or if the logical function should be split in multiple domains is out of the scope of this presentation and it's anyway not relevant as long as LI security requirements are ensured.

A splitting of LI management function module function in multiple domains would imply also the increase of interfaces between them and the MANO management function.

The provided solution does not put limitations on the interaction flow with other management entities needed to achieve LI management function module functions.

The LI-system 100 and the cloud based network 200 may comprise the other well-know methods, components, units or blocks according standardization, but said methods and details are omitted so as not to obscure the description of the present technology with unnecessary detail.

The illustrated LI system 100 comprises the new arrangement 110, hereafter denoted LI management function module, and a LI Administration Mediation Function, ADMF, 120. The LI management function module may comprise one or more processor circuitry which is programmable and comprises at least one processor and memory storage for storing program instructions and data to be executed by the processor 112. Further, the LI management function module further comprises an LI management function module database 114 comprising e.g. LI policies.

The database comprises in persistent way two kind of information:
LI service policy; and
LI security policy.

LI service policy is the rules used to determine if LI shall be activated on a specific VNF. Each rule is indexed on a VNF type and should contain at least the identity of the operator, country and datacenter for which the LI can be activated.

Further rules can be context specific as:
minimize duplicated intercepted points;
use only media interception;
privilege passive or active method;
activated only SIP signaling interception;
etc.

and their applicability can be determined only at run time. LI security policy comprises allowed VNF security profiles and, eventually, context specific security control to be executed by LI management function module before to proceed with LI activation/modification on a node. The security profiles are expected to comprise the VNF identities, the user created VNFs, the security features activated for the VM, e.g. hardening, memory scrambling, Trusted boot, integrity check, virtual interfaces restrictions etc.

The context specific rules can be a mandatory check as to verify that there is no other VNF with same IP address in the network or query orchestrator for anomaly in the creation/modification history of the VNF etc.

The LI system 100 is connected via a LI system network to the cloud computing system 200. The LI system comprises the standard interfaces (X1; X2; X3) of which X1 is the only illustrated interface.

The cloud computing system 200 comprises at least one Internal Interception Function, IIF, 210, Cloud Managers 220 and an OSS/BSS 230.

The network function IIF 210 is configured according to the Network Function Virtualization NFV.

If the virtual network function is an IIF or host an embedded IIF, the transformation to NFV lead to the same split i.e. a virtual IIF in NFV is expected to be decomposed in the following parts:
a Virtual Network Function with an embedded Internal Interception Function, VNF/IIF, 270;
a container interface 275;
a host function comprising a virtualization layer 280 and Hardware (HW) resource layer 290 comprising computing HW, storage HW and network HW.

As direct consequence of the NFV functional decomposition now also IIF in a node get split on the several layers and the X interfaces need to be defined in both.

In addition to that the container interface the additional layers could offer new channels and method for interception in the respective administrative domain.

The example of this is the possibility to monitor traffic via Application Programming interfaces provided by a hypervisor (at container interface level) or the possibility to attach HW probe system to the infrastructure (at HW level).

From management perspective, ETSI NFV have foreseen also the split of the management features of the Cloud Managers 220 into cloud NFV orchestrator 240, VNF manager 250 and an infrastructure manager 260.

The management is logically divided in function handling the respective administrative domains since it's expected to be provided by different vendors.

The creation and maintenance of any service in this infrastructure would then need an interaction between all the management functions. Such interactions and interfaces are standardized in the following NFV reference architecture:

The details for different manager roles and their interfaces are specified in ETSI standard document DGS/NFV-MAN001 and related documents. A short description is given below:
The NFV Orchestrator 240 is the single point of access for all requests from the OSS 230 to simplify the interfacing.
The NFV Orchestrator 240 handles lifecycles of Network Service and VNF Forwarding Graph.
The VNF Manager 250 handles VNF lifecycle from an application point of view;
The NFV Orchestrator 240 has the end-to-end view of the resources being allocated across Network Services and VNFs by VNF Managers 250, so all requests for resource allocation transit through the NFV Orchestrator;
The OSS collaborates with NFV orchestrator to complement and trigger application management actions at tenant level.

The relevant aspect for the herein provided solution is that all examples of creation and lifecycle management flows reported in ETSI DGS/NFV-MAN001 need to be achieved as collaboration between all the managers at various layers.

In order to achieve their functions, the orchestrator shall interact with other NFV MANO (management and orchestration) managers, i.e. the OSS/BSS and the cloud managers. The LI management function module therefore comprises four new interfaces:
LI-App 130: application layer interface between LI management function module and IIF function in the VNF or in the infrastructure;
LI-Ma 132: management interface between LI management function module and a general orchestrator called cloud orchestrator;
LI-Os 136: the OSS interface between LI management function module and OSS/BSS system.
LI-LI 138: the LI interface (may be internal to LI site) between LI management function module and the LI Intercept Mediation System, IMS, comprising LI ADMF and MF/DFs. The LI interface may be internal to LI site.

The LI-App 130 is a new logical interface between the LI management function module and the virtual IAP (applicable both if the LI function is embedded realized as a VNFC or the IAP is the entire VNF).

The role is to activate and configure the LI function in the appropriate way according to a defined policy.

In practice the basic expected steps are to activate the LI function using base security credentials or other initial trusting and authentication mechanism and then configure local LI application level parameters (e.g. national dependent ones) and X network connection parameters (e.g. SSL credential, keep alive period). Security encryption keys, passwords, certificates, etc. are examples of security credentials.

Note that for a traditional Telecommunications service and related virtualized IAPs the policy to apply could be an easy decision since implicitly derived from the already well regulated existing standards.

Also security policy check like configuration data integrity can be performed via this interface.

It is worth to note that LI-App is a logically separate interface from X1 which role is to provision and control the LI warrants in fact it can be used to secure setup or modify the X1.

The LI-Ma 132 is a new logical interface between LI management function module and cloud orchestrator. The fundamental role is to get LI management function module timely aware (e.g. via notification) of which service has been instantiated, scale in/out, moved to other DC together all related security information (data center location, security policy, owner etc.).

The LI management function module would then use this information for LI policy/strategy decisions and trigger correct LI configuration actions e.g. activate LI only on selected IAPs or decide to instantiate a passive virtual LI function attached to selected virtual traffic nodes.

The secondary role of this interface is to let LI management function module order the instantiation of specific VNF, VNFC or services needed for LI (e.g. decryption service, passive probe) and setup related secure virtual network connection with traffic nodes to be monitored.

Actually similar interfaces (notification or new VNF/service order) are expected already available for normal purposes from the orchestrator. The additional need then would be to provide on top of them the security mechanism that makes the LI interactions not detectable by unauthorized people.

In the picture it is considered the possibility that such logical interface is split in several interfaces towards the various managers in NFV architectures. It would depend on the actual realization of the NFV architecture in a specific cloud deployment e.g. in case of managers from multiple vendors some information can be available only from some of them or in case it's explicitly chosen to perform interception only at certain NVF layer/domain. The LI-Os 136 is the interface between the LI management function module and OSS/BSS system instantiated in a tenant domain.

Being the OSS responsible of the full configuration and maintenance of the Telco service executed by one or multiple VNF it's the only one that could provide info about the specific service characteristics and actual operational status of the service to be monitored.

As for LI-Ma, LI-Os is expected to timely provide such information to LI management function module via notification or via query to a NBI (North Bound Interface) interface. In addition to cloud orchestrator the OSS can give more info about the status of the service and for what concern LI can notify when the node is ready for the LI configuration.

The OSS info is expected then to complement the information of the cloud orchestrator for LI policy/strategy decision in LI management function module.

Depending on the actual implementation of Orchestrator and OSS/BSS system the LI-Os I/F can be tunneled via the LI-Ma I/F and vice-versa.

As for LI-Ma the LI-Os could be an extension of existing NBI interfaces provided that LI related interworking is not detectable by unauthorized personnel (it could be not a big issue since e.g. notification of new service characteristic to an external entity does not require OSS to know that such info will be used for LI purposes).

The LI-LI interface 136 is the logical interface between the LI management function module and the LI ADMF. The LI management function module 110 is considered as an evolution of the current ADMF function but anyway it performs a very specific new function of preparing and maintaining a LI solution in a virtualized network along a cloud telecom service lifecycle. The logical separation between LI management function module and ADMF function can be also reflected in a different deployment of them e.g. the ADMF and MF/DF can be allocated as a virtual site LI and in a tenant domain while the orchestrator can operate for multiple LI virtual sites over multiple tenant domains.

The LI-LI interface 136 has the role to communicate with LI ADMF/MF function info about new/modified VNFs and that can start to manage LI targets when all the LI functions needed for a particular service have been properly allocated and configured. It has the role to stop it as well in case of security anomalies or changes in the network which requires a major re-configuration.

Figure 3:
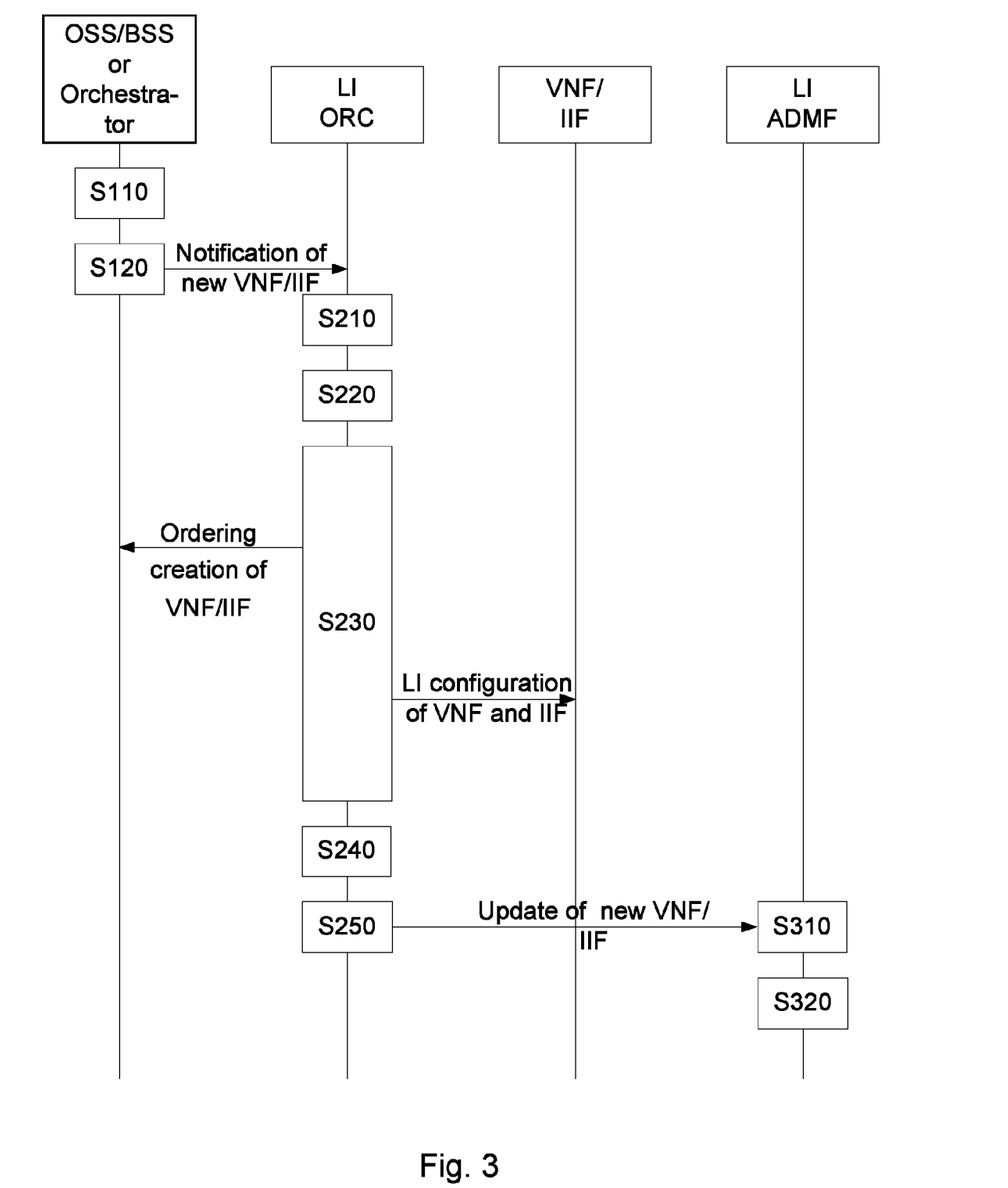
FIG. 3 is a sequence scheme illustrating different methods.

FIG. 3 is a signaling scheme illustrating the process of setting up Virtual Network Function, VNF, operating as an Internal Interception Function, VNF/IIF, of a LI system. Following function entities are involved in said process: OSS/BSS (230 in FIG. 9) alternatively Cloud Manager (220 in FIG. 9), LI management function module (110 in FIG. 9), VNF/IIF (270 in FIG. 9), LI policy database (114 in FIG. 9) and LI ADMF (120 in FIG. 9).

The process starts when the OSS/BSS or Cloud Manager notifies the LI management function module that one or more new VNF or a VNF/IIF node has been set-up in the cloud computing system. VNF/IIF is a VNF node wherein the IIF is embedded. One or more VNFs could have been created. The OSS/BSS is adapted to send via the LI-Os interface a message comprising information, e.g. Node type, VNF/IIF identification and connection details. Alternatively, the Cloud Orchestrator is adapted to send via the LI-Ma interface a message comprising said virtual node information. Thus, the OSS/BSS or Cloud Manager are adapted to perform the step of:

S110: Generating a notification comprising VNF and its VNF characteristics; and

S120: Sending notification comprising VNF and its VNF characteristics. Said step are triggered when the OSS/BSS or Cloud Manager sets up a new VNF or VNF/IIF to LI management function module. The VNF could be a VNF node without an embedded IIF or a VNF with an embedded IIF, i.e. a VNF/IIF. Said steps S110 and S120 are illustrated in a separate flowchart in FIG. 5.

LI configuration is a set of parameters to be defined in a IIF in order to activate LI and allocate resources, and to specify protocols and credentials for properly connecting to the LI system.

VNF characteristics are a set of parameters that uniquely identifies the VNF instance in a cloud based network like VNF type, Service type, Security profile. VNF type specifies type of network function like router, etc. Service type specifies the kind of network service provided by the VNF. Security profile specifies network operator, country of the network operator, jurisdiction and specific security restriction, e.g. LI allowed or not. The VNF characteristics could also involve capability information, such as quantity of resources available for the VNF like, memory, CPU, HW resources of the VNF.

When the LI management function module receives a sent notification comprising new VNF or VNF/IIF from the OSS/BSS or Cloud Manager, the LI management function module is adapted to perform a method S200

FIG. 3 is a signaling scheme illustrating the process of setting up Virtual Network Function, VNF, operating as an Internal Interception Function, VNF/IIF, of a LI system. Following function entities are involved in said process: OSS/BSS (230 in FIG. 9) alternatively Cloud Manager (220 in FIG. 9), LI management function module (110 in FIG. 9), VNF/IIF (270 in FIG. 9), LI policy database (114 in FIG. 9) and LI ADMF (120 in FIG. 9).

The process starts when the OSS/BSS or Cloud Manager notifies the LI orchestrator that one or more new VNF or a VNF/IIF node has been set-up in the cloud computing system. VNF/IIF is a VNF node wherein the IIF is embedded. One or more VNFs could have been created. The OSS/BSS is adapted to send via the LI-Os interface a message comprising information, e.g. Node type, VNF/IIF identification and connection details. Alternatively, the Cloud Orchestrator is adapted to send via the LI-Ma interface a message comprising said node information. Thus, the OSS/BSS or Cloud Manager are adapted to perform the step of:

S110: Generating a notification comprising VNF and its VNF characteristics; and

S120: Sending notification comprising VNF and its VNF characteristics. Said step are triggered when the OSS/BSS or Cloud Manager sets up a new VNF or VNF/IIF to LI management function module. The VNF could be a VNF node without an embedded IIF or a VNF with an embedded IIF, i.e. a VNF/IIF.

Figure 5:
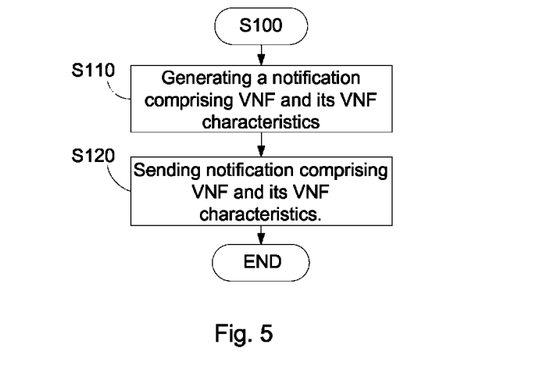
FIG. 5 is a flowchart of a method for starting LI configuration.

Said steps S110 and S120 are illustrated in a separate flowchart in FIG. 5

Figure 4A:
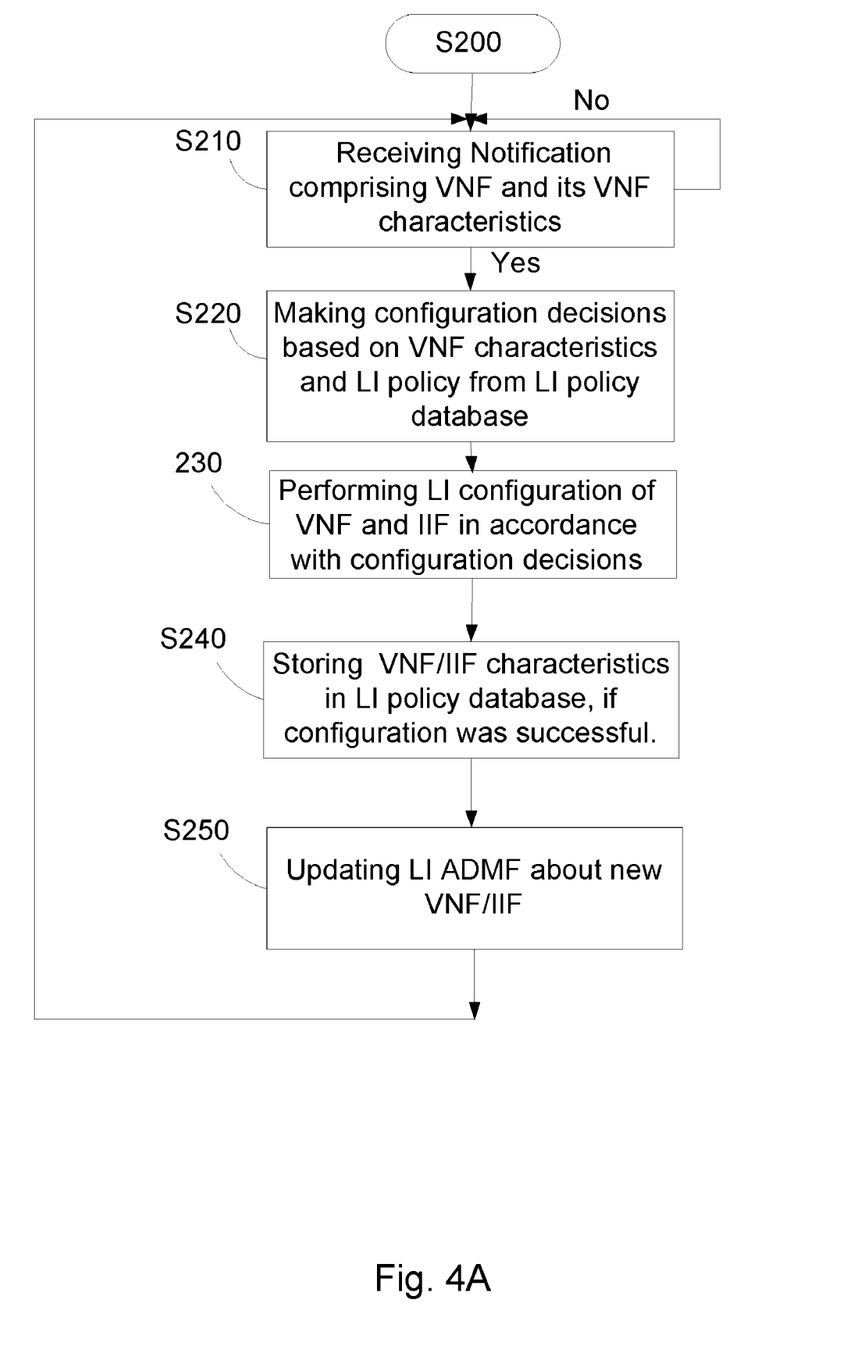
FIG. 4A is a flowchart showing a method for LI configuration of a cloud based network.

When the LI management function module receives a sent notification comprising new VNF or VNF/IIF from the OSS/BSS or Cloud Manager, the LI management function module is adapted to perform a method S200 for LI configuration of an Internal Interception Function, IIF, hosted by Virtual Network Function, VNF, in a cloud based network and for keeping an LI administration mediation function, ADMF, in a LI system, updated regarding the current LI configuration in the cloud based network Said method, as illustrated in the flowchart in FIG. 4A, comprises the steps of:

S210:—Receiving a Notification comprising VNF and its VNF characteristic. As long as there is no notification, "No", the LI management function module is in a stand-by mode. When a notification is received, "yes", this event triggers the following steps:

S220:—Making configuration decisions based on VNF characteristics and LI policy database. The LI management function module uses the VNF characteristics for retrieving a set of policy rules designated for each parameter in the VNF characteristics. Thus, the applicable set of policy rules, which f when evaluated results in decisions for the LI management function module how to proceed with the LI configuration of the VNF.

S230:—Performing LI configuration of VNF and IIF accordance with configuration decisions.

Step S230 may involve different checks and test resulting in whether configuration should continue or should stop. Further, it is of interest for the configuration process whether the Intercept function is embedded or not, which is illustrated in an embodiment of the method, see flowchart in FIG. 4B.

The method S200 further comprises a step S240:

Storing VNF/IIF characteristics in LI policy database, if configuration was successful. If the configuration is not successful, the configuration has been stopped, and an alarm may be sent to an alarm handling unit. If the configuration was successful, the LI ADMF may be informed as in step S250:

Updating the LI ADMF about new LI configuration of the cloud based network. Necessary information is sent to the LI ADMF enabling it to have control of each VNF node being involved in the LI operation.

Figure 4B:
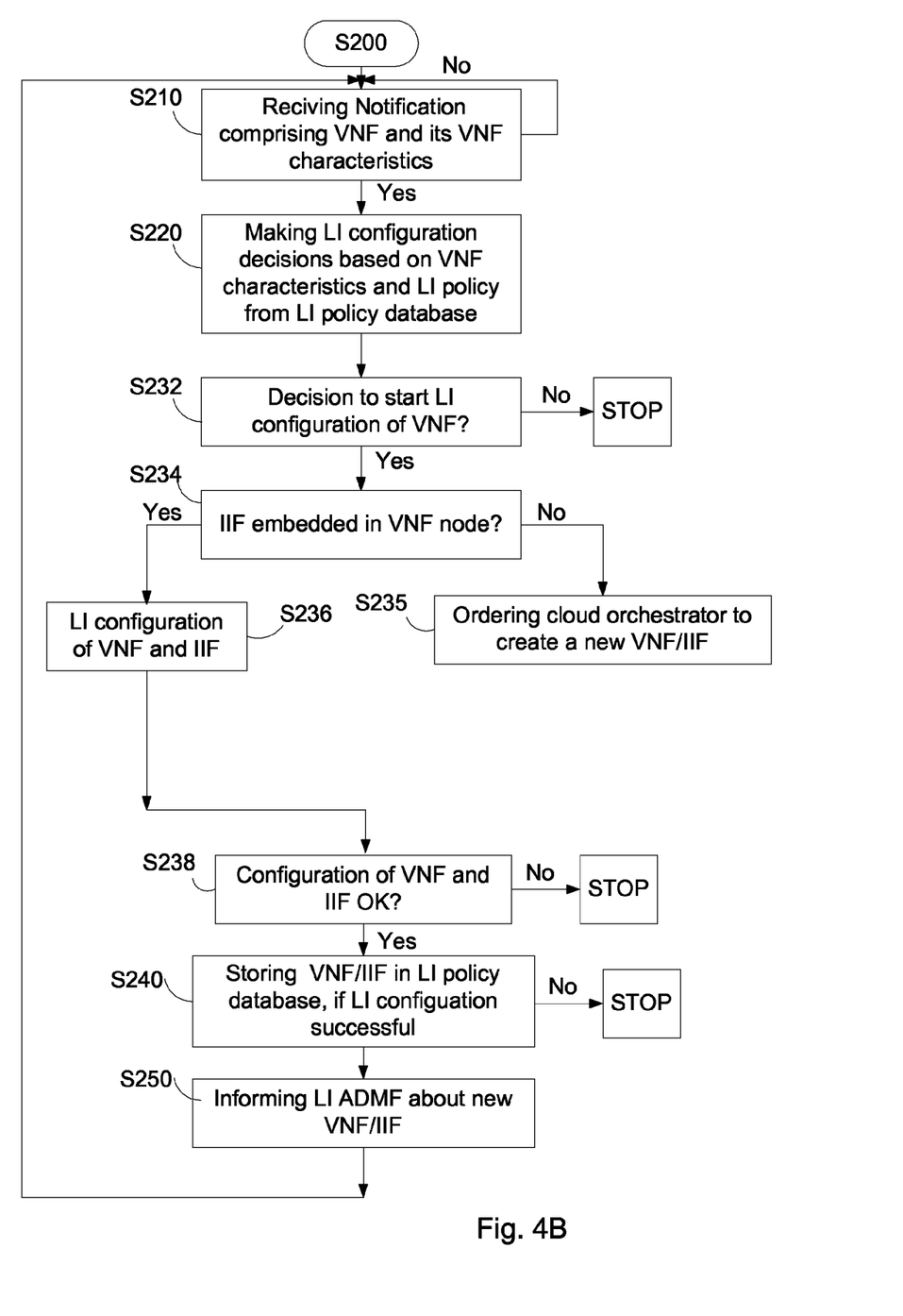
FIG. 4B is illustrating an embodiment of the method for LI configuration of a cloud based network.

An embodiment of the method S200 is illustrated in FIG. 4B.

Said embodiment, as illustrated in the flowchart in FIG. 4B, comprises the steps of:

S210:—Receiving a Notification comprising VNF and its VNF characteristic.

S220:—Making configuration decisions based on VNF characteristics and LI policy database.

As stated above, step 230 may involve different tests and checks. It is tested whether LI is needed and allowed for the VNF type in question, for the country and jurisdiction to which it belongs, if network is trusted, if operator allows LI, etc. This could be decided based on the VNF characteristics and LI policy in the LI policy data base:

S232:—Decision or starting LI configuration of VNF if LI is needed and allowed. If not both needed or allowed, than the configuration process is stopped.

Further, it is tested if the IIF is already embedded in the VNF in question,

S234: Is IIF embedded in VNF node?

If the decision is yes, LI management function module performs step S236:

LI configuration of VNF and IIF. It is further tested in step S238 if configuration of VNF and IIF is OK. It may be tested by means of a request-response mechanism. If not OK, the process is stopped. IF OK, step S240 and S250 is performed:

S240: Storing VNF/IIF in LI policy database, if LI configuration successful; and S250: "Updating LI ADMF about new VNF/IIF.

If test in S234 in "no", the LI management module is adapted to:

S235: Ordering cloud orchestrator to create a new VNF/IFF.

When the VNF/IIF has been created, step S120 is performed again and the module is notified. The module will now run steps S210 to step S236 (not S235 as IIF now is embedded in the VNF) is performed:

LI configuration of VNF and IIF.

If configuration was successful, steps S240 and S250 are performed.

The method S200 is also performed if the notification received, in step S210, comprises a notification of capacity modification.

Figure 6:
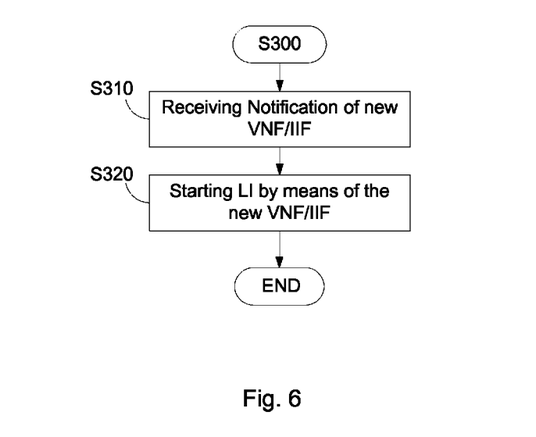
FIG. 6 is a flowchart of a method performed in a LI ADMF.

As already mentioned above, when the LI ADMF receives the notification of new VNF/IIF, it is configured to perform the steps of method S300. Said method S300 is illustrated in FIG. 6. The method S300 may comprise following steps:

S310: Receiving a notification of new VNF/IIF;

S320: Starting LI by means of the new VNF/IIF.

In S310, the notification is received from the LI management function module.

Figure 7:
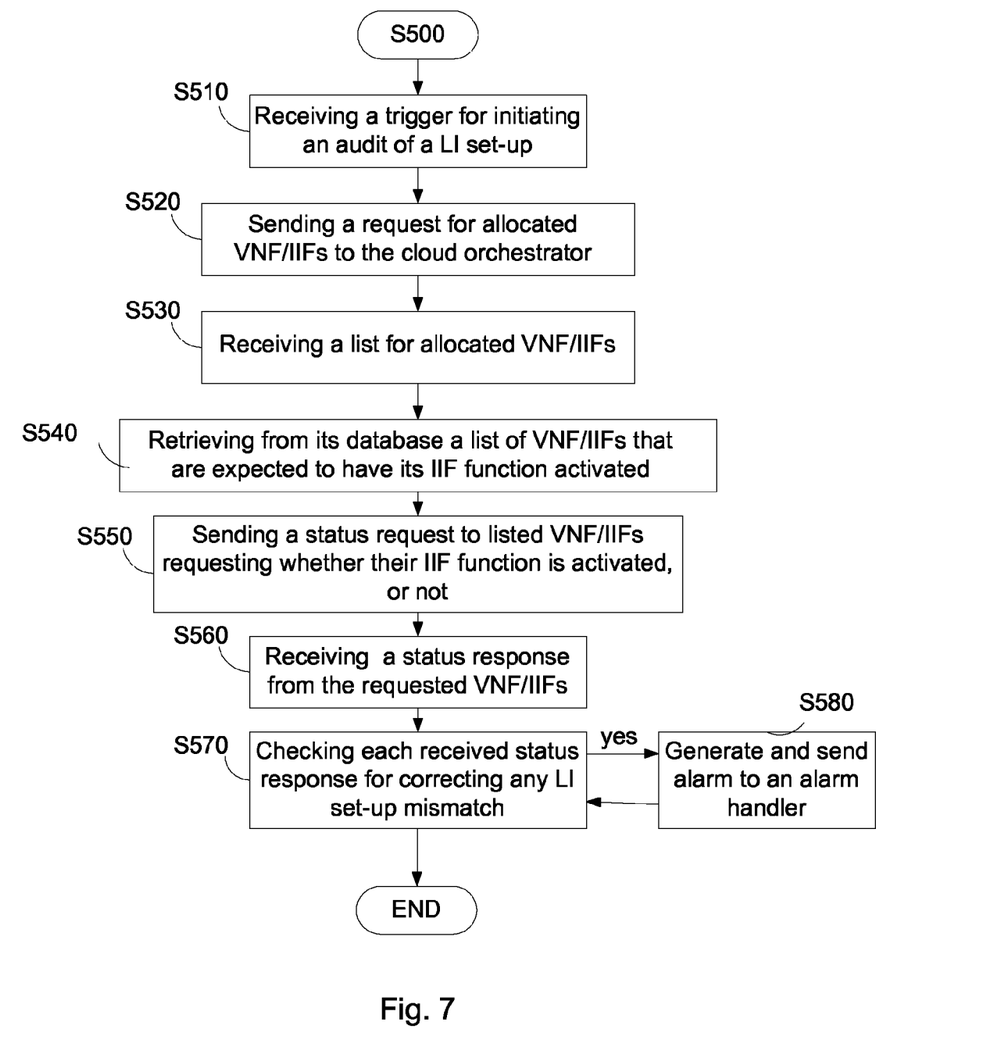
FIG. 7 is a flowchart illustrating an audit method in a management module.

It is a method S500 in a Lawful Intercept, LI, orchestrator for audit of a LI set-up of a Virtual Network Function, VNF, operating as an Internal Interception Function, IIF, in a LI system and communications network hosted by a cloud computer system network comprising a cloud orchestrator and an OSS/BSS.

FIG. 7 is a flowchart illustrating the steps of the method S500.

The audit of the current LI setup is manually triggered or scheduled by a LI security auditor.

Said method performed by the LI management function module comprises:

S510:—Receiving a trigger for initiating an audit of a LI set-up.

The trigger for initiating an audit of a LI set-up is received on request from a LI security auditor. The method further comprises:

S520:—Sending a request for allocated VNF/IIFs;

S530:—Receiving a list for allocated VNF/IIFs.

The LI management function module collects the list of allocated VNFs or a set of VNFs associated with one virtual IAP with the same IP address. The sending of a request and receiving a list for allocated VNFs are sent to the OSS/BSS via the LI-App or the cloud orchestrator via the Li-Ma. The list of allocated VNF/IIF is updated as the new VNF with LI are created and configured. This list is stored in the database. The method further comprises:

S540:—Retrieving from its database a list of VNF/IIFs that are expected to have its IIF function activated;

S550:—Sending a status request to listed VNF/IIFs requesting whether their IIF function is activated, or not;

S560:—Receiving a status response from the requested VNF/IIFs.

The LI management function module fetches from its database the list of VNF/IIF that are expected to have IIF function activated. The status request and status response are sent to and received from the OSS/BSS via the LI-App The method further comprises:

S570:—Checking each received status response for correcting any LI set-up mismatch.

The LI management function module compares retrieved information from VNF/IIF with information fetched in the previous step S560. The LI management function module verifies via LI-App interface for all allocated VNF/IIFs (not all, only the ones supporting LI) if LI is activated. If "yes", the VNF/IIF returns the current LI configuration. If "no", VNF/IIF returns a message "NO LI configured".

Figure 8:
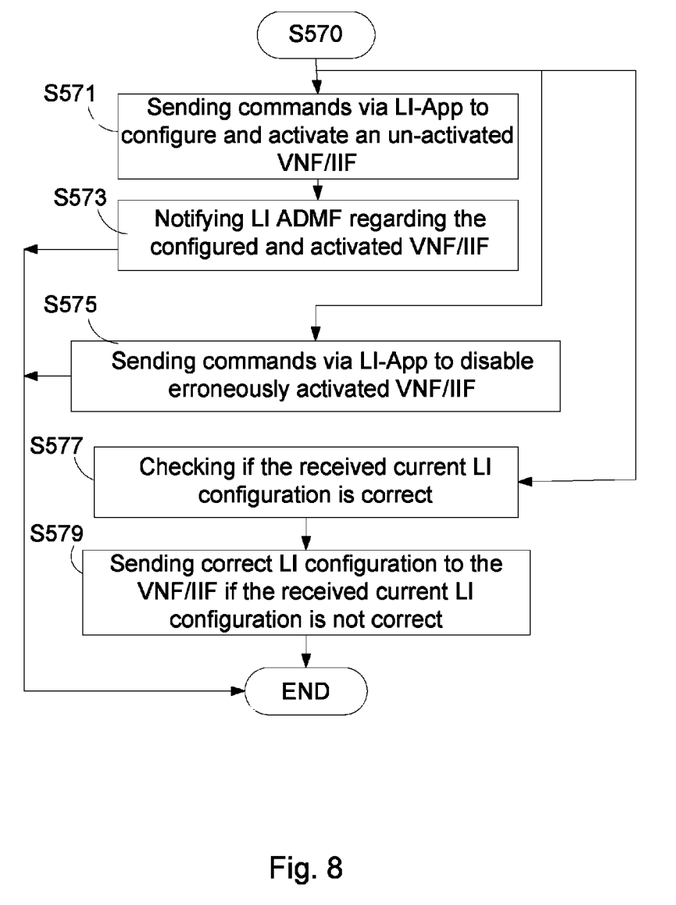
FIG. 8 is a flowchart showing a sub-process of the audit method.

FIG. 8 is a flowchart illustrating the sub-steps of step S570.

The step of checking, S570, in the method S500 comprises:

S571:—Sending commands via LI-App to configure and activate an un-activated VNF/IIF; and S573:—notifying LI ADMF regarding the configured and activated VNF/IIF.

If a VNF/IIF is not activated as expected then LI management function module is adapted to send commands to configure LI via LI-App and to notify LI ADMF. The LI ADMF may be adapted to to start to manage interception target and mediate media for said target. The step of checking S570 may also comprise:

S575:—sending commands via LI-App to disable erroneously activated VNF/IIF. If a VNF/IIF is erroneously activated the LI management function module sends commands to disable LI via LI-App.

The step of checking S570 may further comprise:

S577:—checking if the received current LI configuration is correct; and

S579:—sending correct LI configuration to the VNF/IIF if the received current LI configuration is not correct.

The method S500 may comprise:

S580:—Sending an alarm to an alarm handling unit for each discovered LI set-up mismatch.

an LI management function module sends an alarm for each detected mismatch via LI-LI interface to LI-ADMF or via another interface to an external alarm handler.

Figure 10:
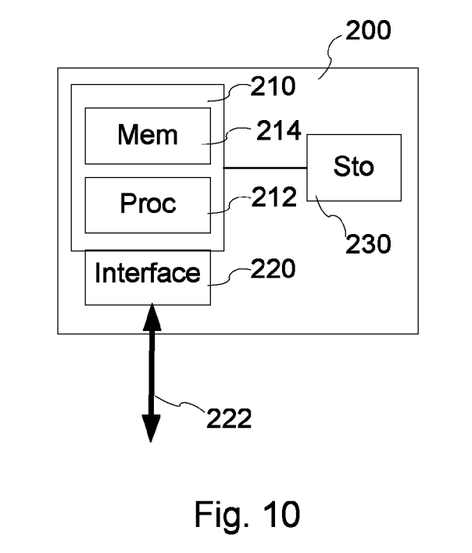
FIG. 10 is illustrating an LI management function module.

FIG. 10 is illustrating an LI management function module adapted to perform the method S200 and embodiments thereof.

The LI management function module 200 may comprise a processor circuitry 210, which is programmable and comprises a processor 212 and memory storage 214 for storing program instructions to be executed by the processor 212. The processor circuitry may be electrically connected to a communication interface 220 for enabling transmission 222 to or from the LI module, and to an optional additional storage 230 comprising data to be processed or other computer program software to be retrieved and executed by the processor 212. The LI module comprises a processing circuitry 200 which is operative to perform the method steps of:

Receiving Notification comprising VNF and its VNF characteristics;

Making LI configuration decisions based on VNF characteristics and LI policy from LI policy database;

Performing LI configuration of VNF and IIF in accordance with configuration decisions;

Storing VNF/IIF characteristics in LI policy database, if configuration was successful;

Updating the LI ADMF about new LI configuration of the cloud based network.

Figure 11:
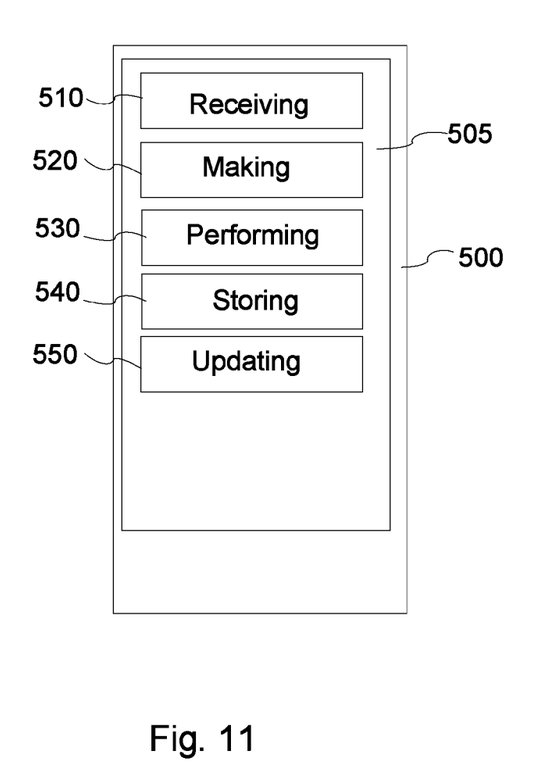
FIG. 11 is illustrating another embodiment of a LI management function module.

FIG. 11 is illustrating another embodiment of the LI management function module. The LI management function module 500 may comprise a processor circuitry 505. Said processor circuitry comprises:

means for receiving 510 Notification comprising VNF and its VNF characteristics;

means for making 520 LI configuration decisions based on VNF characteristics and LI policy from LI policy database;

means for performing 530 LI configuration of VNF and IIF in accordance with configuration decisions;

means for storing 540 VNF/IIF characteristics in LI policy database, if configuration was successful;

means for updating 550 the LI ADMF about new LI configuration of the cloud based network.

The entities and units described above with reference to FIGS. 9-11 may be considered as logical units, and do not necessarily correspond to separate physical units. Thus, the person skilled in the art would appreciate that the units disclosed in the FIG. 9 may be implemented as physically integrated units, and/or physically separate units, and that the units are provided with appropriate processing circuits.

The following advantages have been identified by the current invention:

It fills a critical functional gap in the current ETSI LI reference architecture respect to ETSI NFV new architecture.

Establish a reference method to be used as guidance in the evolution of LI solution in ETSI NFV based network towards an agreed LI reference architecture, functions and responsibilities.

Enable interoperability between different vendors providing IIF in VNF or at infrastructure level and LI management application.

Provide a method which can be extended also for overall LI security monitoring by adding management of ad hoc security virtual network feature for LI.

Enable avoidance of resource waste and duplicated interception info providing a base method to implement an optimal and dynamic choice of number of interception points, MF dimensioning and LI network setup according to the type of network service.

Provide a method with can be used also to provide a flexible virtualized LI system especially regarding the scalability of LI mediation and delivery functions.

A number of embodiments of the present technique have been described. It will be understood that various modifications may be made without departing from the scope of the technique. Therefore, other implementations are within the scope of the following claims.

The invention claimed is:

1. A method in a Lawful Intercept (LI) management module for LI configuration of an Internal Interception Function (IIF) hosted by a Virtual Network Function (VNF)

in a cloud based network and for keeping a LI administration mediation function (ADMF) in a LI system updated regarding the current LI configuration in the cloud based network, the method comprising:
- receiving a notification comprising a VNF and its VNF characteristics;
- making LI configuration decisions based on VNF characteristics and a LI policy from a LI policy database;
- performing LI configuration of the VNF and the IIF (VNF/IIF) in accordance with the LI configuration decisions;
- storing VNF/IIF characteristics in the LI policy database, if configuration was successful; and
- updating the LI ADMF about a new LI configuration of the cloud based network.

2. The method according to claim 1, wherein performing LI configuration of the VNF/IIF further comprises deciding
- to start LI configuration of the VNF if LI is needed and allowed.

3. The method according to claim 1, wherein performing LI configuration of the VNF/IIF further comprises:
- checking if the IIF is embedded in a VNF node; and
- ordering an orchestrator of the cloud based network to create a new VNF/IIF.

4. The method according to claim 1, wherein the method further comprises checking if configuration of the VNF/IIF is OK or not.

5. The method according to claim 1, wherein the notification is received from an OSS/BSS.

6. The method according to claim 3, wherein the notification is received from the cloud orchestrator.

7. A Lawful Intercept (LI) system comprising:
- a LI administration mediation function (ADMF);
- a LI policy database;
- a LI management module for LI configuration of an Internal Interception Function (IIF) hosted by Virtual Network Function (VNF) in a cloud based network and for keeping a LI ADMF updated regarding the current LI configuration in the cloud based network, the LI management module comprising a processing circuitry configured to:
- receive a notification comprising a VNF and its VNF characteristics;
- make LI configuration decisions based on the VNF characteristics and a LI policy from the LI policy database;
- perform LI configuration of the VNF and the IIF (VNF/IIF) in accordance with the LI configuration decisions;
- store VNF/IIF characteristics in the LI policy database, if configuration was successful; and
- update the LI ADMF about a new LI configuration of the cloud based network.

8. The LI system according to claim 7, wherein performing LI configuration of the VNF/IIF further comprises:
- deciding to start LI configuration of the VNF if LI is needed and allowed.

9. The LI system according to claim 7, wherein performing LI configuration of the VNF/IIF further comprises:
- checking if IIF is embedded in the VNF node; and
- ordering an orchestrator of the cloud based network to create a new VNF/IIF.

10. The LI system according to claim 7, wherein performing LI configuration of the VNF/IIF further comprises:
- checking if configuration of VNF/IIF is OK or not.

11. The LI system according to claim 7, wherein the notification is received from an OSS/BSS.

12. The LI system according to claim 9, wherein the notification is received from the cloud orchestrator.

* * * * *